US012374795B2

(12) United States Patent
Li

(10) Patent No.: US 12,374,795 B2
(45) Date of Patent: Jul. 29, 2025

(54) ELECTRONIC DEVICE AND ANTENNA DEVICE

(71) Applicant: PanelSemi Corporation, New Taipei (TW)

(72) Inventor: Chin-Tang Li, New Taipei (TW)

(73) Assignee: PANELSEMI CORPORATION, New Taipei (TW)

( * ) Notice: Subject to any disclaimer, the term of this patent is extended or adjusted under 35 U.S.C. 154(b) by 133 days.

(21) Appl. No.: 18/194,160

(22) Filed: Mar. 31, 2023

(65) Prior Publication Data

US 2023/0318184 A1 Oct. 5, 2023

(30) Foreign Application Priority Data

Apr. 1, 2022 (TW) ................................ 111112938

(51) Int. Cl.
*H01Q 9/04* (2006.01)
*H01Q 1/22* (2006.01)
*H01Q 1/48* (2006.01)

(52) U.S. Cl.
CPC ............ *H01Q 9/0407* (2013.01); *H01Q 1/22* (2013.01); *H01Q 1/48* (2013.01)

(58) Field of Classification Search
CPC ........... H01Q 1/22; H01Q 1/243; H01Q 1/48; H01Q 9/0407; H01Q 9/045
See application file for complete search history.

(56) References Cited

U.S. PATENT DOCUMENTS

2015/0070228 A1* 3/2015 Gu ........................ H01Q 25/00 343/727
2020/0259243 A1* 8/2020 Jeon ........................ H01Q 1/38
2020/0313279 A1* 10/2020 Kim ...................... H01Q 21/08

FOREIGN PATENT DOCUMENTS

WO WO-2021085665 A1 * 5/2021 ............ H01Q 1/243

* cited by examiner

*Primary Examiner* — Hoang V Nguyen
(74) *Attorney, Agent, or Firm* — Muncy, Geissler, Olds & Lowe, P.C.

(57) ABSTRACT

An antenna device includes a first substrate, an antenna element, a second substrate, a circuitry, and one or more conductive structures. The antenna element is arranged on one surface of the first substrate, and the second substrate is arranged on another surface of the first substrate. The conductive structure defines a through hole at least penetrating through the second substrate and a conductive member arranged in the through hole. At least some of the conductive structures are electrically connected to the antenna element and the circuitry, and the antenna elements are electrically connected to corresponding electronic elements.

17 Claims, 6 Drawing Sheets

ELECTRONIC DEVICE AND ANTENNA DEVICE

CROSS REFERENCE TO RELATED APPLICATIONS

This Non-provisional application claims priority under 35 U.S.C. § 119(a) on Patent Application No(s). 111112938 filed in Taiwan, Republic of China on Apr. 1, 2022, the entire contents of which are hereby incorporated by reference.

BACKGROUND

Technology Field

This disclosure relates to an electronic device and, in particular, to an antenna device with a thinning structure feature.

Description of Related Art

As the improvement of communication technology, the applications of communication technology in technology products have been increasing, thereby making related communication products more diversified. Particularly, in recent years, the consumer's requirements for the functions of communication products have become higher, so many communication products with different designs and functions have been continuously proposed. Electronic products with wireless communication function are a hot trend recently. In addition, the technology of integrated circuit is more and more mature, which makes the size of products tends to be lighter, thinner and smaller.

In communication products, the antennas used in electronic devices with wireless communication function must have the characteristics of small size, good performance and low cost in order to be widely accepted and affirmed by the markets. Among various kinds of antennas, the patch antenna has the following advantages of: 1. having a planar structure that can be easily integrated with components and circuits; 2. small size, low height, light weight and easy fabrication, so that it is suitable for mass production of printed circuits; and 3. easy to design linear polarization, circular polarization, dual frequency, broadband and other characteristics, so it is becoming more and more common in wireless products.

Moreover, as the development of low-orbit satellites, the demand for phased array antennas also arises. Therefore, it is desired to solve the thickness problem of patch antennas, related devices (such as applying the patch antennas to the phased array antenna structures), and derived diversified applications (such as fields involving the integration of heterogeneous materials), etc.

SUMMARY

One or more exemplary embodiments of this disclosure are to provide an electronic device and an antenna device with a thinning structure feature, thereby being compatible with the thinning requirements of current electronic products.

One or more exemplary embodiments of this disclosure are to provide an electronic device and an antenna device with involving the integration of heterogeneous materials.

An electronic device of one exemplary embodiment includes a first substrate, a metal unit, a second substrate, a circuitry, an electronic element and one or more conductive structures. The first substrate is defined with a first surface and a second surface opposite to each other. The metal unit is distributed on the first surface of the first substrate, and the second substrate is arranged on the second surface of the first substrate. The second substrate is defined with a connecting face for connecting the first substrate and a working face opposite to the connecting face. The circuitry is arranged on the second substrate. The electronic element is arranged on the working face of the second substrate and electrically connected to the circuitry. Each conductive structure defines a through hole penetrating through the second substrate at least and comprises a conductive member arranged in the through hole. One of the conductive structures is electrically connected to the metal unit and the circuitry, and the metal unit corresponds the electronic element. The first substrate and the second substrate are made of different materials.

In one exemplary embodiment, the first substrate is a rigid board.

In one exemplary embodiment, the first substrate includes glass, polytetrafluoroethene (PTFE), glass fiber epoxy resin, polyphenylene oxide (PPO), or ceramic materials.

In one exemplary embodiment, the second substrate is a resilient board.

In one exemplary embodiment, the second substrate includes polyimide (PI).

In one exemplary embodiment, the through hole of each of the conductive structures further penetrates through the first substrate.

In one exemplary embodiment, the first substrate has one or more internal conductive structures in a normal direction perpendicular to the first surface, each of the internal conductive structures includes a through hole and an internal conductive member arranged in the through hole and electrically connected to a signal layer, the signal layer is located between the first substrate and the second substrate, and the internal conductive structures are electrically connected to the signal layer and the conductive structures.

In one exemplary embodiment, the electronic device further includes a grounding layer electrically connected to the electronic element.

In one exemplary embodiment, the grounding layer includes tin, gold, copper or silver material, or an alloy or eutectic comprising any of the above materials.

In one exemplary embodiment, the conductive member of each of the conductive structures is isolated with the grounding layer.

In one exemplary embodiment, the grounding layer is located between the first substrate and the second substrate.

In one exemplary embodiment, the grounding layer is arranged on the first surface of the first substrate.

In one exemplary embodiment, the electronic element includes a first signal terminal electrically connected to the circuitry and a second signal terminal electrically connected to the grounding layer.

In one exemplary embodiment, some of the conductive structures are electrically connected to the grounding layer, and the electronic element includes a first signal terminal electrically connected to the circuitry and a second signal terminal electrically connected to the grounding layer via one of the conductive structures.

In one exemplary embodiment, the electronic element is a driving element.

An antenna device of one exemplary embodiment includes a first substrate, a plurality of antenna elements, a second substrate, a circuitry, a plurality of electronic elements, and a plurality of conductive structures. The first substrate is defined with a first surface and a second surface opposite to each other. The antenna elements are distributed on the first surface of the first substrate, and the second substrate is arranged on the second surface of the first substrate. The second substrate is defined with a connecting face for connecting the first substrate and a working face opposite to the connecting face. The circuitry is arranged on the second substrate. The electronic elements are arranged on the working face of the second substrate and electrically connected to the circuitry. Each conductive structure defines a through hole penetrating through the second substrate at least and includes a conductive member arranged in the through hole. At least some of the conductive structures are electrically connected to the antenna elements and the circuitry, and the antenna elements are electrically connected to the electronic elements correspondingly.

In one exemplary embodiment, the first substrate is a rigid board.

In one exemplary embodiment, the first substrate comprises glass, polytetrafluoroethene, glass fiber epoxy resin, polyphenylene oxide, or ceramic materials.

In one exemplary embodiment, the second substrate is a resilient board.

In one exemplary embodiment, the second substrate comprises polyimide.

In one exemplary embodiment, the through hole of each of the conductive structures further penetrates through the first substrate.

In one exemplary embodiment, the first substrate has one or more internal conductive structures in a normal direction perpendicular to the first surface, each of the internal conductive structures comprises a through hole and an internal conductive member arranged in the through hole and electrically connected to a signal layer, the signal layer is located between the first substrate and the second substrate, and the internal conductive structures are electrically connected to the antenna elements and the conductive structures.

In one exemplary embodiment, the antenna device further includes a grounding layer electrically connected to the electronic elements.

In one exemplary embodiment, the grounding layer includes tin, gold, copper or silver material, or an alloy or eutectic comprising any of the above materials.

In one exemplary embodiment, the conductive member of each of the conductive structures is isolated with the grounding layer.

In one exemplary embodiment, the grounding layer is located between the first substrate and the second substrate.

In one exemplary embodiment, the grounding layer is arranged on the first surface of the first substrate.

In one exemplary embodiment, the electronic element includes a first signal terminal electrically connected to the circuitry and a second signal terminal electrically connected to the grounding layer.

In one exemplary embodiment, some of the conductive structures are electrically connected to the grounding layer, and the electronic element includes a first signal terminal electrically connected to the circuitry and a second signal terminal electrically connected to the grounding layer via one of the conductive structures.

In one exemplary embodiment, the electronic element is a driving element.

In one exemplary embodiment, the driving element is an RFIC.

In one exemplary embodiment, the electronic element is a varactor.

BRIEF DESCRIPTION OF THE DRAWINGS

The disclosure will become more fully understood from the detailed description and accompanying drawings, which are given for illustration only, and thus are not limitative of the present disclosure, and wherein.

DETAILED DESCRIPTION OF THE DISCLOSURE

The present disclosure will be apparent from the following detailed description, which proceeds with reference to the accompanying drawings, wherein the same references relate to the same elements.

Figure 1A:
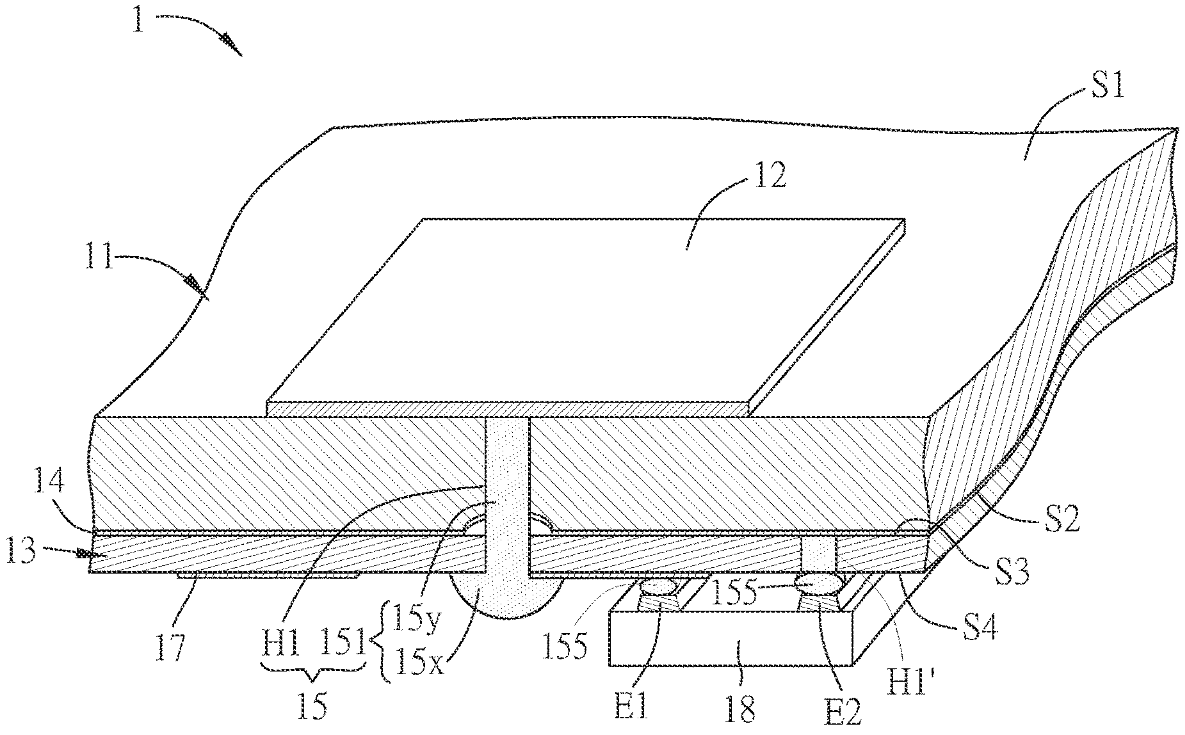
FIG. 1A is a sectional perspective view of an electronic device according to an embodiment of this disclosure.
Figure 1B:
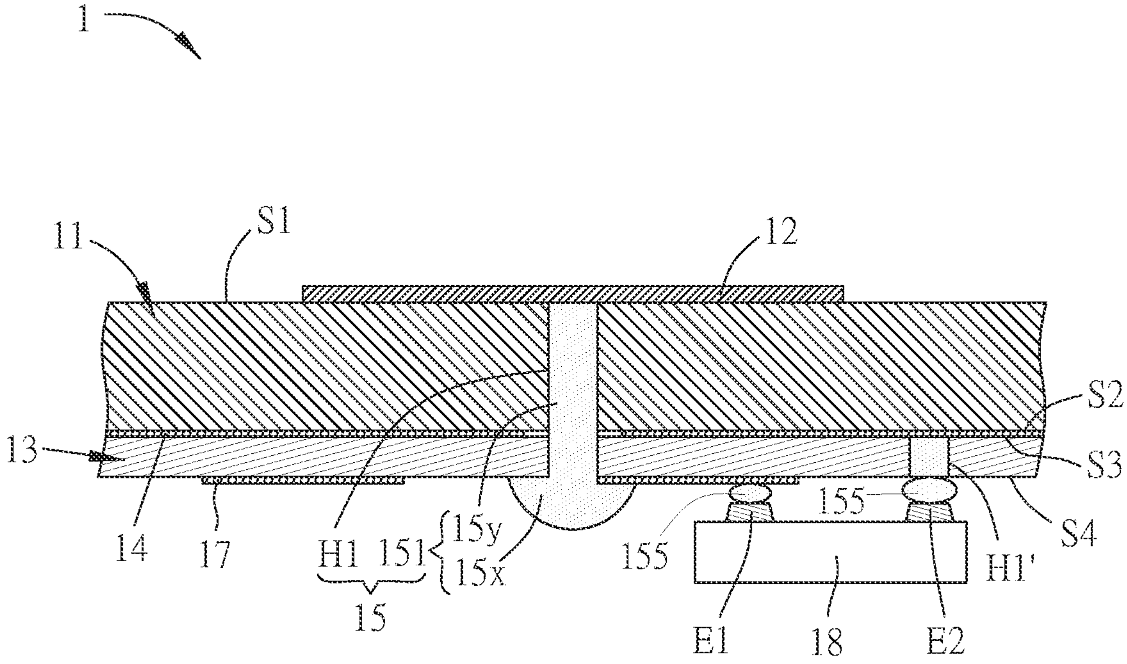
FIG. 1B is a schematic diagram of the electronic device of FIG. 1A.

FIG. 1A is a sectional perspective view of an electronic device 1 according to an embodiment of this disclosure, and FIG. 1B is a schematic diagram of the electronic device 1 of FIG. 1A.

Referring to FIGS. 1A and 1B, the electronic device 1 includes a first substrate 11, one or more metal units 12, a second substrate 13, a circuitry 17, an electronic element 18, and one or more conductive structures 15. One of the conductive structures 15 is electrically connected to the metal unit 12 and the circuitry 17, and the metal unit 12 is electrically connected to the electronic element 18 correspondingly. The first substrate 11 and the second substrate 13 are made of different materials.

The first substrate 11 is defined with a first surface S1 and a second surface S2 opposite to each other. In this embodiment, the first surface S1 is the top surface of the first substrate 11, and the second surface S2 is the bottom surface of the first substrate 11. The first substrate 11 can be a resilient board, a rigid board or composite board, and the material thereof can include glass, glass fiber epoxy resin (FR4), LTCC, polyimide (PI), polytetrafluoroethene (PTFE), polyphenylene oxide (PPO) or polyphenylene ether (PPE), or a composite material containing any of the above-mentioned materials. To be noted, the hardness of the board is relative to the resilient board. Moreover, the first substrate 11 can be a single-layer substrate, a multi-layer substrate, or a composite substrate. In this embodiment, the first substrate 11 is a rigid board, such as a single-layer glass substrate.

The metal unit 12 can be a conductive patterned layer configured of a simple electrical connection function, or of a specific function. For one specific function, the metal unit 12 can include an antenna module containing one or more antenna elements. In this embodiment, each metal unit 12 is, for example, a single antenna element, and the antenna element is disposed on the first surface S1 of the first substrate 11. In case of plural of antenna elements concluded in one or more antenna module, the antenna elements are arranged along the first surface S1 of the first substrate 11. In some embodiments, the surface of the antenna element can be planar or non-planar. The antenna element according to this embodiment is a flat antenna. In some embodiments, the shape of the antenna element can be polygonal (e.g. quadrilateral), circular, elliptical, sector or circular. In this embodiment, the shape of the antenna element is quadrilateral (e.g. square). In some embodiments, the first substrate 11 can further include a circuit patterned layer, which is electrically connected to the one or more metal units 12. This disclosure is not limited thereto.

The second substrate 13 can be directly or indirectly disposed on the second surface S2 of the first substrate 11. The second substrate 13 is defined with a connecting face S3 for connecting the first substrate 11 and a working face S4 opposite to the connecting face S3. For example, the second substrate 13 can be attached to the bottom surface of the first substrate 11 by adhesive (e.g. insulating adhesive (not shown)). The second substrate 13 can be a resilient board, a rigid board or a composite board. To be noted, the hardness of the board is relative to the resilient board. For example, the second substrate can include glass, glass fiber epoxy resin (FR4), ceramics, polyimide (PI), polytetrafluoroethylene (PTFE), polyphenylene oxide (PPO) or polyphenylene ether (PPE), or a substrate made of a composite material including at least one of the above-mentioned materials. The second substrate 12 is not limited to a single-layer substrate, a multi-layer substrate, or a composite substrate. In this embodiment, the second substrate 13 is a resilient board such as a PI substrate, and specifically a single-layer PI substrate.

The circuitry 17 is arranged on the second substrate 13. In this embodiment, the circuitry 17 is, for example, arranged on the bottom surface (the working face S4) of the second substrate 13 away from the first substrate 11. This disclosure is not limited thereto. In different embodiments, the circuitry 17 can be arranged on the top surface (the connecting face S3) of the second substrate 13 facing the first substrate 11, or the circuitry 17 can be arranged on both surfaces of the second substrate 13, which are facing and away from the first substrate 11, respectively. Moreover, the circuitry 17 can be arranged on both surfaces of the second substrate 13 as well as the inner side of the second substrate 13. This disclosure is not limited thereto. In some embodiments, the circuitry 17 can include a conductive layer or/and conductive wires, so that the second substrate 13 can serve as a driving circuit board. In some embodiments, the material of the circuitry 17 can include metals (e.g. gold, copper or aluminum, or combination containing any thereof), or an alloy of any combination containing any of the above-mentioned metals, or any of other conductive materials.

The conductive structure 15 defines one through hole H1 penetrating through the second substrate 13 at least, and includes a conductive member 151 arranged in the through hole H1 for electrically connection between the metal unit 12 and the circuitry 17. In this case, the through hole H1 can further penetrate through the first substrate 11 as shown in FIG. 1A and FIG. 1B. In addition, the conductive structure 15 and a grounding layer 14 (to be described below) are electrically isolated (e.g. electrically insulated) from each other. To be noted, the term "electrically isolated" (electrically insulated) means that the conductive structure 15 and the grounding layer 14 are not electrically connected in nature unless an additional conductive member is applied thereto. The conductive member 151 includes, for example but not limited to, tin, gold, copper or silver materials, or alloys or eutectics containing any of the above materials, or any of other conductive metal materials. The above-mentioned conductive materials can be arranged in the through hole H1 by spraying, coating, high-temperature melting (e.g. laser melting) or electroplating or other ways, so that the aforementioned conductive material can be filled within the through hole H1. In another case, the conductive member 151 can be in the form of a sleeve, a column, a pin or a needle. In this embodiment, the conductive member 151 further includes a large-diameter segment 15*x* and a small-diameter segment 15*y*. The aforementioned "large-diameter" and "small-diameter" are determined by the physical sizes relative to each other. The small-diameter segment 15*y* is electrically connected to the metal unit 12 (antenna element), the maximum width of the large-diameter segment 15*x* is greater than the diameter of the through hole H1, and the large-diameter segment 15*x* at least overlaps and electrically connects a part of the circuitry 17. To be understood, the conductive structure 15 can be directly or indirectly electrically connected to the metal unit 12. Herein, the "indirectly" connected means, for example, the conductive structure 15 is electrically connected to the metal unit 12 through a conductive layout of the first substrate 11, which would be introduced later. It should be noted that the metal unit 12 (antenna element) is not limited to fully cover the through hole H1. In some embodiments, a conductive layout is distributed on the first surface S1 of the first substrate 11, the metal unit 12 (antenna element) is electrically connected to the conductive layout, and the aforementioned conductive layout overlaps the through hole H1 (not shown). In some embodiments, the metal unit 12 (antenna element) is located adjacent to the through hole H1, and they are electrically connected through the aforementioned conductive layout (not shown). To be noted, the conductive element 151 can be a selection or a combination of the aforementioned aspects, or a combination containing one. The conductive member 151 can be directly or indirectly electrically connected to the metal unit 12 (antenna element), and can meet the requirements of good impedance matching with the metal unit 12 (antenna element), less transmission loss, small radiation effect, and sufficient frequency bandwidth and power capacity.

The electronic element 18 is disposed on the second substrate 13, and it can be a driving element, an active element, a passive element, an active circuit or a passive circuit. In some embodiments, the electronic element 18 is arranged on the working face S4 of the second substrate 13. In some embodiments, the electronic element 18 can include a power amplifier (PA), a low noise amplifier (LNA), a varactor, a passive component, any combination thereof, or any combination containing one thereof. To be noted, the type or quantity of the aforementioned electronic elements is not limited. In some embodiments, one or more electronic elements 18 can be high frequency components. Herein, the term "high frequency" can be defined as a frequency range between 3 MHz and hundreds of GHz. In some embodiments, the electronic element 18 can be a power amplifier or/and a low noise amplifier that is made of, for example but not limited to, GaAs, GaN, InP or a combination thereof. In some embodiments, one or more electronic components 18 can be a passive component, such as an RLC circuit. In some embodiments, one or more than one of the electronic elements 18 can be a flip-chip component (i.e., a surface mount device (SMD)). In some embodiments, one or more than one of the electronic elements 18 can be thin-film components made by thin-film process, such as thin-film transistors (TFT). The thin-film process can be a manufacturing process of semiconductor such as low-temperature polysilicon (LTPS), high-temperature polysilicon (HTPS) low-temperature polycrystalline oxide (LTPO), indium-gallium-zinc oxide (IGZO). In some embodiments, one or more than one of the electronic elements 18 can be an RFIC or a driving IC (e.g. IC including or excluding silicon). The RFIC can be, for example, a silicon-based RFIC, or a non-silicon RFIC (e.g. GaAs MMIC), which is configured to drive the metal unit 12 (antenna element) to transmit wireless signals. The type or model of the electronic element 18 is not limited in this disclosure. Therefore, the signal (e.g. an RF signal) emitted by the electronic element 18 can be electrically connected to the metal unit 12 (antenna element) through the circuitry 17 and the conductive structure 15, and then be transmitted through the metal unit 12 (antenna element).

In this embodiment, the electronic element 18 is, for example, a flip-chip component. One of the signal terminals E1 of the electronic element 18 is electrically connected to the circuitry 17 on the second substrate 13, and the other signal terminal E2 of the electronic element 18 is electrically connected to another electrical layer (e.g. grounding layer). In some embodiments, the electronic element 18 can include at least one signal terminal E1 or at least one signal terminal E2 (it may be one or more signal terminals E1 or E2). In some embodiments, the electronic element 18 is, for example, a surface mount device (SMD), but this disclosure is not limited thereto. In this case, the signal terminal E1 is electrically connected to the circuitry 17 by surface mount technology (SMT), while the signal terminal E2 is electrically connected to another electrical layer. They are electrically connected respectively through conductive materials 155, which may include tin, gold, copper or silver, or an alloy or eutectic containing any of the above materials, or any of other conductive metal materials. This disclosure is not limited thereto. In some embodiments, the signal terminals E1 and E2 of the electronic element 18 can also be melted by high temperature (e.g. laser melting) to form a eutectic connection, and the materials thereof can also be those mentioned above.

In this embodiment, the signal terminal E2 is electrically connected to another electrical layer (e.g. the grounding layer 14) through another through hole HF of the second substrate 13, the conductive material 155 and the conductive member (not labeled) disposed in the other through hole HF. This disclosure is not limited thereto. In different embodiments, conductive wires, conductive materials or conductive layers can be provided on the side of the second substrate 13 adjacent to the signal terminal E2, so that the signal terminal E2 can be electrically connected to another electrical layer (grounding layer 14) through the conductive wires, conductive materials or conductive layers provided on the side of the second substrate 13, or any of other connection means with similar effects.

In this embodiment, the electronic device 1 further includes a grounding layer 14 electrically connected to the electronic elements 18. The grounding layer 14 can be located on the first surface S1 of the first substrate 11, or between the first substrate 11 and the second substrate 13, or on the working face S4 of the second substrate 13. In this case, a layer of ground metal can be formed between the first substrate 11 and the second substrate 13, or the grounding layer 14 can be provided on the second surface S2 of the first substrate 11 or the connecting face S3 of the second substrate 13. In this embodiment, the grounding layer 14 is, for example, arranged on the second surface S2 of the first substrate 11. Therefore, the grounding layer 14 is arranged on the second surface S2 of the first substrate 11, and then the second substrate 13 is attached to the first substrate 11 formed with the grounding layer 14. Herein, the grounding layer 14 is disposed between the first substrate 11 and the second substrate 13. In some embodiments, the number of the grounding layer 14 can be more than one, or the grounding layer 14 can be disposed inside the above-mentioned substrate. In some embodiments, the grounding layer 14 can be made of tin, gold, copper or silver, or an alloy or eutectic containing any of the above materials, or any of other conductive metal materials, and this disclosure is not limited thereto. As mentioned above, one signal terminal E1 of the electronic element 18 is electrically connected to the circuitry 17, and the other signal terminal E2 thereof can be electrically connected to the grounding layer 14. When the grounding layer 14 and the electronic element 18 are not located on the same side or the same layer, the other signal terminal E2 can be electrically connected to the grounding layer 14 through one of the conductive structures 15.

As mentioned above, in the electronic device 1 of this embodiment, the metal unit 12 (antenna element) is arranged on the first surface S1 of the first substrate 11, the second substrate 13 is arranged on the second surface S2 of the first substrate 11, the electronic element 18 is arranged on the second substrate 13, and the conductive structure 15 is electrically connected to the metal unit 12 on the first substrate 11 and the circuitry 17 of the second substrate 13. Based on this configuration, the signal emitted by the electronic element 18 on the second substrate 13 can be transmitted to the metal unit 12 (antenna element) through the circuitry 17 and the conductive structure 15. Therefore, the compact component configuration that is suitable for the thinning requirements of current electronic products can be achieved. In addition, this configuration also implements the electrical connection of the first substrate 11 and the second substrate 13, which are made of different materials. To be noted, this compact component configuration can also meet the requirements of good impedance matching, less transmission loss, small radiation effect, and sufficient frequency bandwidth and power capacity for high-frequency signals.

FIGS. 2 to 5 are schematic diagrams showing the electronic devices according to different embodiments of this disclosure.

Figure 2:
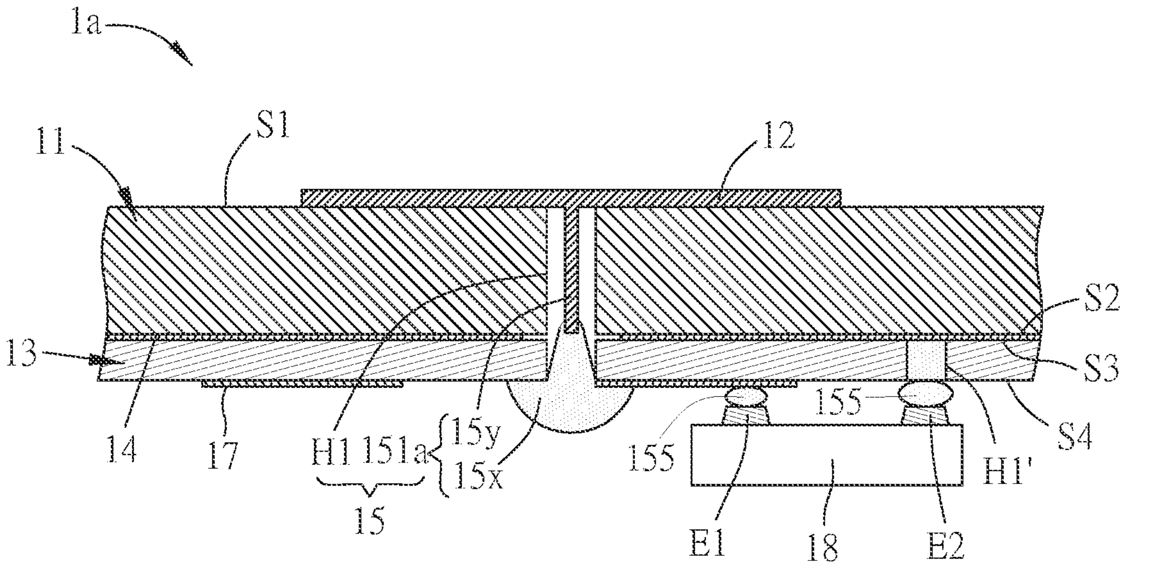
FIGS. 2 to 5 are schematic diagrams showing the electronic devices according to different embodiments of this disclosure.

Unlike the electronic device 1 of the previous embodiment, in the electronic device 1*a* of this embodiment as shown in FIG. 2, the conductive member 151*a* does not fully fill the through hole H1. In this embodiment, the small-diameter segment 15*y* is electrically connected to the metal unit 12 (antenna element), and the maximum width of the large-diameter segment 15*x* is larger than the diameter of the through hole H1.

Figure 3:
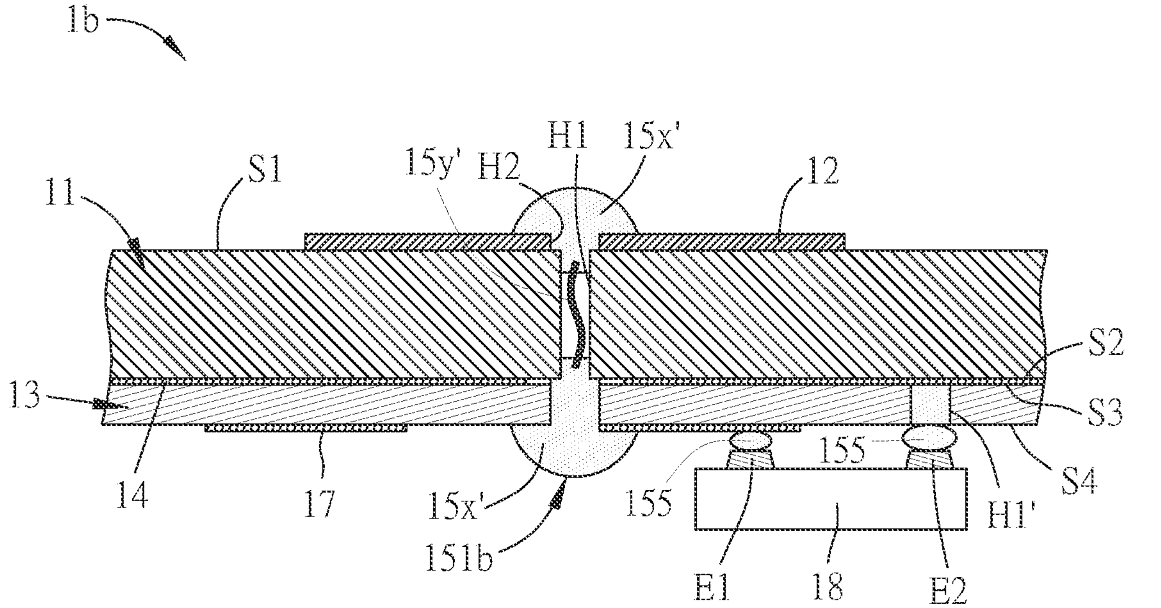

Unlike the electronic device 1 or 1*a* of the previous embodiments, in the electronic device 1*b* of this embodiment as shown in FIG. 3, another wire is provided to electrically connect the metal unit 12 (antenna element) to the conductive structure 15. In this embodiment, the metal unit 12 (antenna element) has a through hole H2, and the conductive member 151*b* electrically connects the metal unit 12 (antenna element) to the circuitry 17 of the second substrate 13 via the through hole H2 and the through hole H1. In this case, the diameters of the through hole H2 and the through hole H1 are not limited to be consistent, nor are they limited to center alignment. The conductive member 151*b* includes a small-diameter segment 15*y*' and two large-diameter segments 15*x*', and one of the large-diameter segments 15*x*' is disposed on and covers the through hole H2. In some embodiments, the small-diameter segment 15*y*' is a wire, which may directly or indirectly contact the hole wall of the through hole H1. Herein, the small-diameter segment 15*y*' can define a wire diameter, which may be greater than or equal to 0.01 mm (millimeters). In this case, the wire diameter is the maximum wire diameter of the small-diameter segment 15*y*' itself. For example, it can be 50 μm (micrometers), 1 mil (about 25 μm, the material thereof can be, for example, copper or gold), 15 μm (the material thereof can be, for example, copper), or 10 μm (the material thereof can be, for example, gold). In some embodiments, the wire diameter of the small-diameter segment 15*y*' may be greater than or equal to 0.005 μm. To be understood, a considerable condition is that the wire diameter of the small-diameter segment 15*y*' needs to be accommodated within the diameters of the through hole H1 and the through hole H2.

Figure 4:
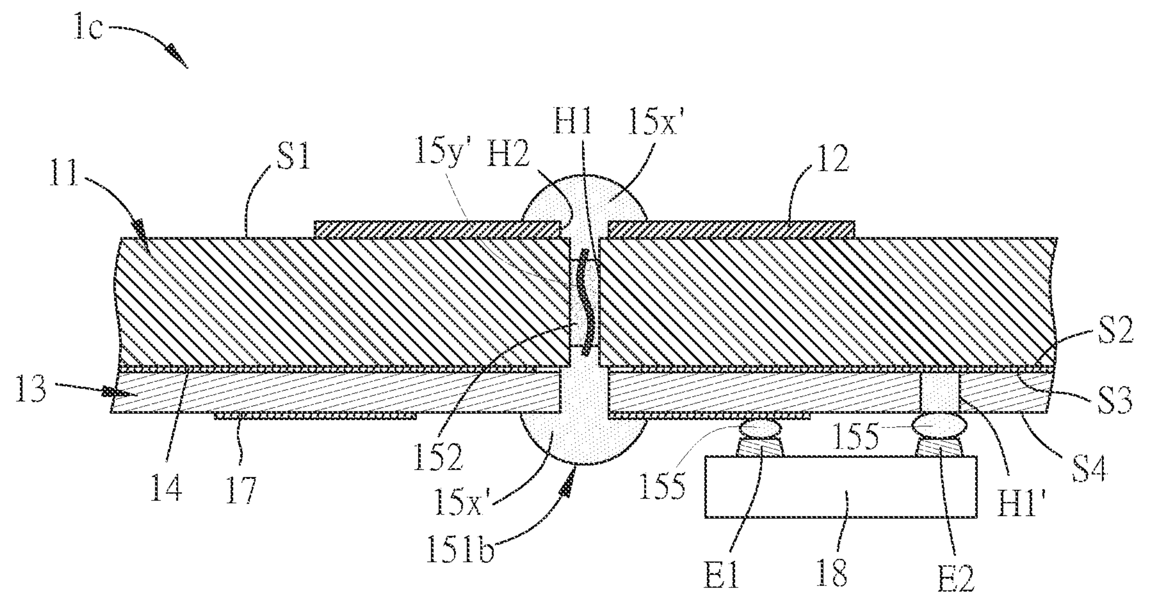

Unlike the electronic device 1*b* of the previous embodiment, the electronic device 1*c* of this embodiment as shown in FIG. 4 further includes a filling member 152 arranged in the through hole H1, and the filling member 152 connects the conductive wire (15*y*') and the hole wall of the through hole H1. In this embodiment, the filling member 152 fully fills the space in the through hole H1, but this disclosure is not limited thereto. In some embodiments, the filling member 152 can be an organic material, which can include silicon series materials, acrylic series materials, or resin series materials. The features of the filling member 152 of this embodiment can also be applied to the embodiment as shown in FIG. 2 or the embodiment utilizing high-temperature melting.

Figure 5:
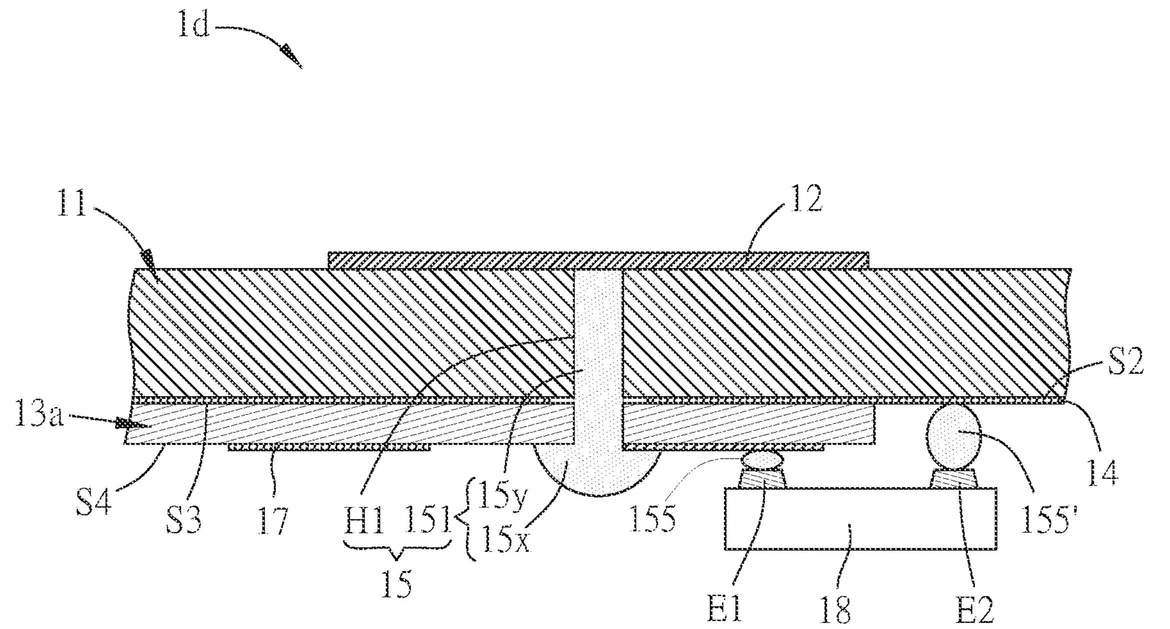

Unlike the electronic device 1 of the previous embodiment, the electronic device 1*d* of this embodiment as shown in FIG. 5 further includes two conductive materials 155 and 155'. In this embodiment, the conductive materials 155 and 155' are, for example, conductive pastes, and the thickness of the conductive material 155' is greater than that of the conductive material 155. Based on the material properties of the second substrate 13 and the conductive material 155', the thickness of the conductive material 155' can also be greater than that of the second substrate 13*a*. The signal terminal E1 of the electronic element 18 is electrically connected to the circuitry 17 of the second substrate 13*a* through the conductive material 155, and the signal terminal E2 of the electronic element 18 protrudes from the side of the second substrate 13*a* and is electrically connected to the grounding layer 14 through the conductive material 155'. The aforementioned "thickness" refers to the thickness in the direction perpendicular to the first surface S1 or the second surface S2 of the first substrate 11. The material of the conductive material 155 or 155' can include, for example but not limited to, tin, gold, copper or silver, or an alloy or eutectic containing any of the above materials, or any of other conductive metal materials. The features of the thicker conductive material 155' of this embodiment can also be applied to the above-mentioned embodiments.

In some embodiments, the thickness of the conductive material 155 or 155' can be increased by suitable manufacturing processes such as thin-film process or printing process. The thickness of the conductive material 155' can be optionally thickened or kept unchanged as long as it can be electrically connected to the grounding layer 14. In other embodiments, the conductive materials 155 and 155' can be omitted (not shown), and the signal terminal E2 can be thickened by means of high-temperature melting so as to electrically connect to the grounding layer 14. In some embodiments, the grounding layer 14 is located on the side of the first substrate 11 facing the second substrate 13*a*, and extends outwardly so as to further connect the second substrate 13*a* (not shown), thereby corresponding and electrically connecting to the signal terminal E2 of the electronic element 18.

In some embodiments, the number of metal units 12 can be one or more, and the metal units 12 and the first substrate 11 can form, for example, a unit array, such as for example but not limited to a rectangular array or a circular array. The above embodiments are based on one of the metal units 12. In addition, the number of the conductive structures 15 can be one or more, so as to correspond to the number of the metal units 12 respectively. In this case, at least one metal unit 12 is controlled by one of the electronic elements 18. For example, the number of electronic elements 18 can be one or more and is the same as the number of the antenna units 12, so that the multiple electronic elements 18 correspond to and individually control the metal units 12 in the one-on-one manner. Alternatively, multiple metal units 12 can be actuated (controlled) by the same electronic element 18. This disclosure is not limited thereto.

FIGS. 6A to 6D are schematic diagrams showing the electronic devices according to different embodiments of this disclosure.

Figure 6A:
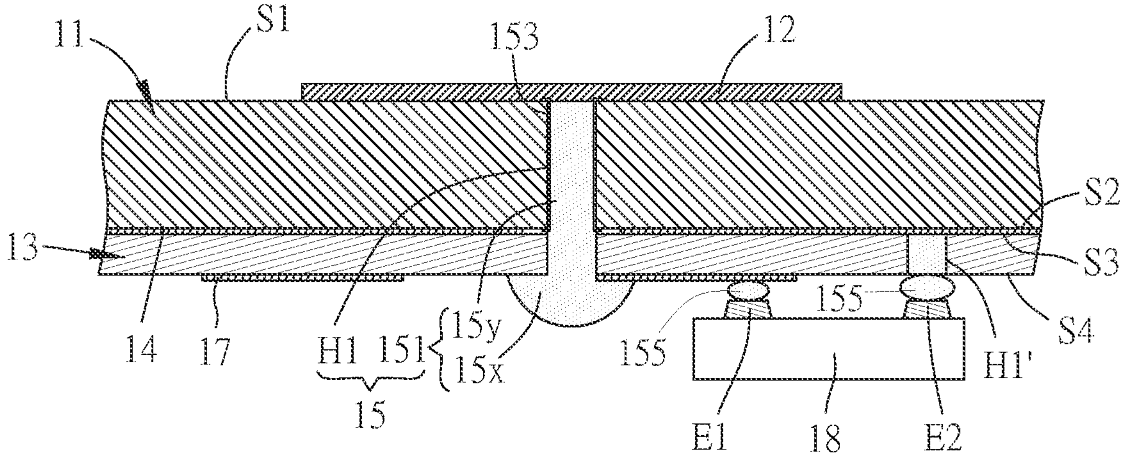
FIGS. 6A to 6D are schematic diagrams showing the electronic devices according to different embodiments of this disclosure.

Unlike the above-mentioned embodiments, the conductive structure 15 as shown in FIG. 6A further includes a metal plating layer 153 at least provided on the part of the through hole H1 located at the first substrate 11. In different embodiments, the conductive structure 15 can further include a metal plating layer (not shown) provided on the part of the through hole H1 located at the second substrate 13. To be noted, the feature of the metal plating layer 153 can be applied to other embodiments of this disclosure without violating physical principles.

Figure 6B:
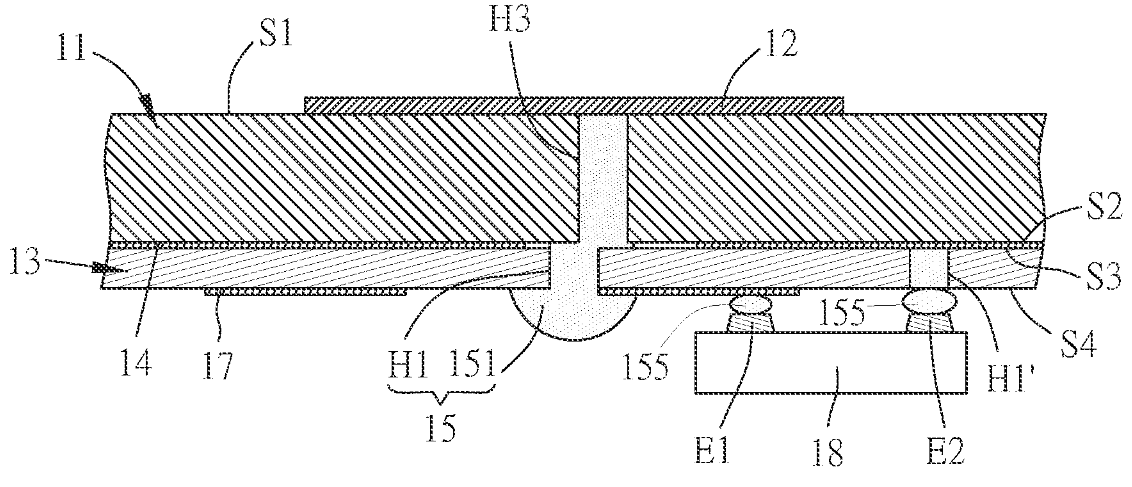

Unlike the above-mentioned embodiments, the embodiment of FIG. 6B discloses that the diameter of the through hole H3 penetrating through the first substrate 11 is different from the diameter of the through hole H1 penetrating through the second substrate 13, and the through holes H1 and H3 are not center aligned. The conductive element 151 is arranged in the through hole H3 and the through hole H1 and communicates with the two through holes H1 and H3. To be understood, the conductive element 151 arranged in the through holes H1 and H3 can be formed by the same process or different processes.

Figure 6C:
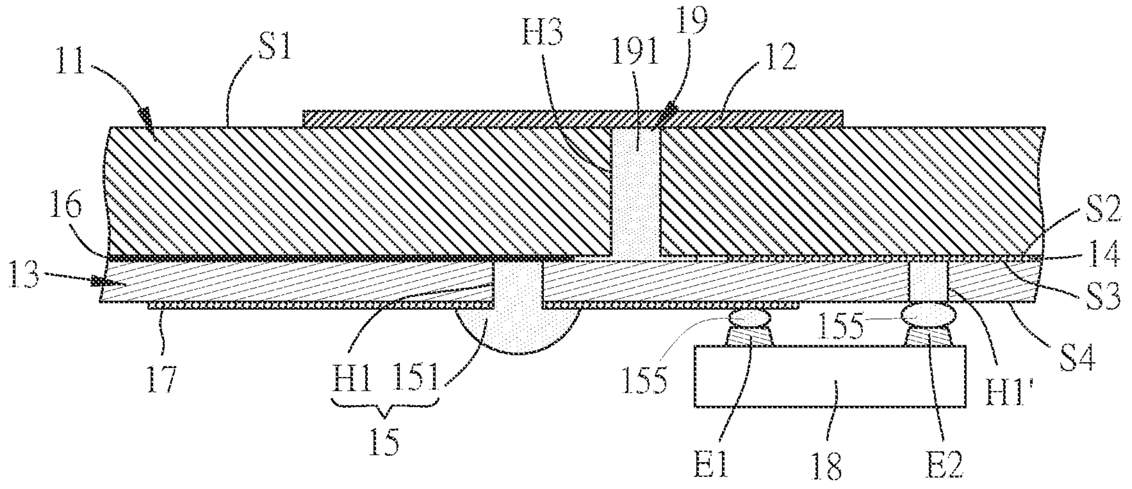
Figure 6D:
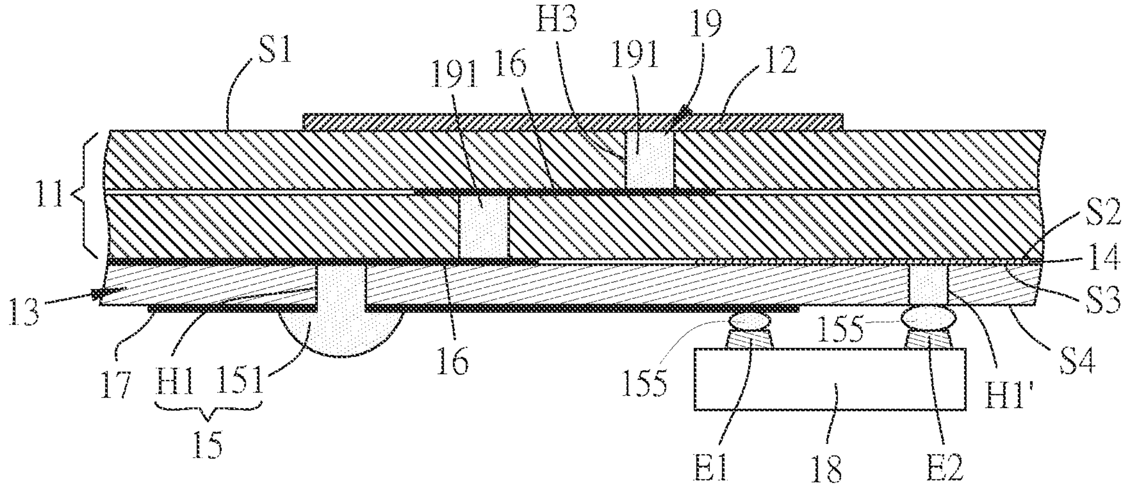

Unlike the above-mentioned embodiments, the embodiment of FIG. 6C discloses that the through hole H3 and the through hole H1 are completely staggered with each other. In this embodiment, the first substrate 11 has an internal conductive structure 19 arranged in a normal direction perpendicular to the first surface S1, and each internal conductive structure 19 includes the aforementioned through hole H3 and an internal conductive member 191 arranged in the through hole H3 and electrically connected to a signal layer 16. The internal conductive structures 19 are electrically connected to the conductive structures 15 and the signal layer 16 between the first substrate 11 and the second substrate 13. Unlike the above-mentioned embodiments, the embodiment of FIG. 6D discloses a plurality of internal conductive structures 19 (e.g. two internal conductive structures), and the internal conductive members 191 of the internal conductive structures 19 can be staggered from each other and arranged in a normal direction perpendicular to the first surface S1. This disclosure is not limited thereto. One of the internal conductive structures 19 can be directly electrically connected to the conductive structure 15, the signal layer 16 or/and the circuitry 17, thereby achieving the same electrical connection effect.

In summary, in the antenna device (electronic device) of this disclosure, one or more metal units is/are arranged along the first surface of the first substrate, the second substrate is arranged on the second surface of the first substrate, the grounding layer is arranged between the first substrate and the second substrate, and the conductive structure is arranged in the through hole and electrically connects the metal unit to the circuitry of the second substrate. One signal terminal of the electronic element is electrically connected to the circuitry, and the other signal terminal thereof is electrically connected to another circuit layer (e.g. the grounding layer). Base on this configuration, the signal emitted by the electronic element can be transmitted to the metal unit through the circuitry and the conductive structure. Therefore, the electronic device of this disclosure can have a compact structure so as to achieve the purpose of thinning products, which can be suitable for the thinning requirements of current electronic products. In addition, the electronic device of this disclosure can integrate substrates of different materials through the conductive structure, and can also derive diversified applications.

Although the disclosure has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the disclosure.

What is claimed is:

1. An electronic device, comprising:
- a first substrate defined with a first surface and a second surface opposite to each other;
- a metal unit distributed on the first surface of the first substrate;
- a second substrate arranged on the second surface of the first substrate and defined with a connecting face for connecting the first substrate and a working face opposite to the connecting face;
- a circuitry arranged on the second substrate;
- an electronic element arranged on the working face of the second substrate and electrically connected to the circuitry;
- one or more conductive structures, each of which defines a through hole penetrating through the second substrate at least and comprises a conductive member arranged in the through hole, wherein one of the conductive structures is electrically connected to the metal unit and the circuitry, and the metal unit corresponds the electronic element;
- a grounding layer electrically connected to the electronic element, wherein the grounding layer is located between the first substrate and the second substrate; and
- an adhesive disposed between the second surface of the first substrate and the connecting face of the second substrate,
- wherein the first substrate and the second substrate are made of different materials,
- wherein the conductive member comprises a large-diameter segment and a small-diameter segment, the small-diameter segment is electrically connected to the metal unit, a maximum width of the large-diameter segment is greater than a diameter of the through hole, the large-diameter segment at least overlaps and electrically connects a part of the circuitry.

2. The electronic device of claim 1, wherein the first substrate is a rigid board.

3. The electronic device of claim 1, wherein the first substrate comprises glass, polytetrafluoroethene, glass fiber epoxy resin, polyphenylene oxide, or ceramic materials.

4. The electronic device of claim 1, wherein the second substrate is a resilient board.

5. The electronic device of claim 1, wherein the second substrate comprises polyimide.

6. The electronic device of claim 1, wherein the through hole of each of the conductive structures further penetrates through the first substrate.

7. The electronic device of claim 1, wherein the grounding layer comprises tin, gold, copper or silver material, or an alloy or eutectic comprising any of the above materials.

8. The electronic device of claim 1, wherein the conductive member of each of the conductive structures is isolated with the grounding layer.

9. The electronic device of claim 1, wherein the grounding layer is arranged on the first surface of the first substrate.

10. The electronic device of claim 1, wherein the electronic element is a driving element.

11. An antenna device, comprising:
- a first substrate defined with a first surface and a second surface opposite to each other;
- a plurality of antenna elements distributed on the first surface of the first substrate;
- a second substrate arranged on the second surface of the first substrate and defined with a connecting face for connecting the first substrate and a working face opposite to the connecting face;
- a circuitry arranged on the second substrate;
- a plurality of electronic elements arranged on the working face of the second substrate and electrically connected to the circuitry;
- a plurality of conductive structures, each of which defines a through hole penetrating through the second substrate at least and includes a conductive member arranged in the through hole;
- a grounding layer electrically connected to the electronic elements, wherein the grounding layer is located between the first substrate and the second substrate; and
- an adhesive disposed between the second surface of the first substrate and the connecting face of the second substrate,
- wherein at least some of the conductive structures are electrically connected to the antenna elements and the circuitry, wherein the antenna elements correspond the electronic elements,
- wherein the conductive member comprises a large-diameter segment and a small-diameter segment, the small-diameter segment is electrically connected to one of the antenna elements, a maximum width of the large-diameter segment is greater than a diameter of the through hole, the large-diameter segment at least overlaps and electrically connects a part of the circuitry.

12. The antenna device of claim 11, wherein the first substrate is a rigid board.

13. The antenna device of claim 11, wherein the second substrate is a resilient board.

14. The antenna device of claim 11, wherein the through hole of each of the conductive structures further penetrates through the first substrate.

15. The antenna device of claim 11, wherein the first substrate has one or more internal conductive structures in a normal direction perpendicular to the first surface, each of the internal conductive structures comprises a through hole and an internal conductive member arranged in the through hole and electrically connected to a signal layer, the signal layer is located between the first substrate and the second substrate, and the internal conductive structures are electrically connected to the antenna elements and the conductive structures.

16. The antenna device of claim 11, wherein the conductive member of each of the conductive structures is isolated with the grounding layer.

17. The antenna device of claim 11, wherein the electronic element is a driving element, an RFIC, or a varactor, or a combination containing any of the above elements.

* * * * *